United States Patent
Torla et al.

(10) Patent No.: US 9,158,499 B2
(45) Date of Patent: Oct. 13, 2015

(54) CRYPTOGRAPHIC PROCESSING WITH RANDOM NUMBER GENERATOR CHECKING

(75) Inventors: Michael J. Torla, Chandler, AZ (US); Steven D. Millman, Gilbert, AZ (US); Thomas E. Tkacik, Phoeniz, AZ (US); Frank James, Herndon, VA (US)

(73) Assignee: FREESCALE SEMICONDUCTOR, INC, Austin, TX (US)

( * ) Notice: Subject to any disclaimer, the term of this patent is extended or adjusted under 35 U.S.C. 154(b) by 0 days.

(21) Appl. No.: 13/460,719

(22) Filed: Apr. 30, 2012

(65) Prior Publication Data

US 2013/0290792 A1 Oct. 31, 2013

(51) Int. Cl.
*G06F 7/58* (2006.01)
*G06F 11/07* (2006.01)

(52) U.S. Cl.
CPC .............. *G06F 7/58* (2013.01); *G06F 11/0751* (2013.01)

(58) Field of Classification Search
CPC ........................................................ G06F 7/58
USPC ........................................................... 380/28
See application file for complete search history.

(56) References Cited

U.S. PATENT DOCUMENTS

| | | | | |
|---|---|---|---|---|
| 6,871,206 B2 * | 3/2005 | Henry et al. | ................... | 708/250 |
| 7,039,190 B1 * | 5/2006 | Engwer et al. | ................ | 380/270 |
| 7,248,833 B2 * | 7/2007 | Lee | ............... | 455/41.2 |
| 7,941,662 B2 * | 5/2011 | Tardo et al. | .................... | 713/168 |
| 8,130,946 B2 * | 3/2012 | De Mare | .......................... | 380/28 |
| 8,194,854 B2 * | 6/2012 | Gueron et al. | ................... | 380/29 |
| 8,259,934 B2 * | 9/2012 | Karroumi et al. | ............... | 380/37 |
| 2004/0172538 A1 * | 9/2004 | Satoh et al. | .................... | 713/175 |
| 2010/0318996 A1 * | 12/2010 | Harris et al. | .................. | 718/102 |
| 2012/0207301 A1 * | 8/2012 | Ramasamy et al. | ............ | 380/44 |

OTHER PUBLICATIONS

The Transport Layer Security (TLS) Protocol—Version 1.1; RFC 4346; Apr. 2006.*
The Design and Implementation of Datagram TLS; Nagendra Modadugu, Eric Rescorla; Nov. 21, 2003.*
How to be sure that random numbers are unique and not duplicated?; http://stackoverflow.com/questions/9557049/how-to-be-sure-that-random-numbers-are-unique-and-not-duplicated retrieved on Jul. 9, 2015; posted Mar 4, 2012.*
Preventing Duplicate Numbers—Java; http://www.dreamincode.net/forums/topic/33470-preventing-duplicate-numbers retrieved on Jul. 9, 2015; posted Sep. 17, 2007.*
XORShift random number generators; http://www.javamex.com/tutorials/random_numbers/xorshift.shtml#.VZ6x8fIdXuw retrieved on Jul. 9, 2015; created 2003.*
Federal Information Processing Standard (FIPS) Publication 140-2 (FIPS PUB 140-2). Security Requirements for Cryptographic Modules, May 25, 2001.

* cited by examiner

*Primary Examiner* — James Turchen (57) ABSTRACT

Embodiments of an electronic circuit comprise a module, such as a security module, configured to perform cryptographic processing for a predetermined security protocol that includes random number checking. The security module is controlled by a descriptor that includes instructions that cause the security module to access a generated random number, compare the generated random number to a random number stored during a previous execution of the descriptor, and generate an error signal when the generated random number and the previous execution random number are equal.

15 Claims, 6 Drawing Sheets

CRYPTOGRAPHIC PROCESSING WITH RANDOM NUMBER GENERATOR CHECKING

BACKGROUND

The Federal Information Processing Standard (FIPS) Publication 140-2 (FIPS PUB 140-2) is a United States government computer security standard that is used to accredit cryptographic modules. The publication is entitled *Security Requirements for Cryptographic Modules* and was initially published on May 25, 2001, with most recent updating on Dec. 3, 2002.

The National Institute of Standards and Technology (NIST) issued the FIPS 140 Publication Series to coordinate requirements and standards for cryptography modules for both hardware and software components. Federal agencies and departments can validate whether a module, termed a Hardware Security Module, is covered by an existing FIPS 140-1 or FIPS 140-2 certificate which specifies module name, hardware, software, firmware, and/or applet version numbers. Cryptographic modules are produced by the private sector or open source communities for use by the U.S. government and other regulated industries, including financial and health-care institutions, that collect, store, transfer, share, and disseminate sensitive but unclassified (SBU) information.

Security programs regulated by NIST address government and industry cooperation to establish secure systems and networks by developing, managing and promoting security assessment tools, techniques, and services, and supporting programs for testing, evaluation and validation. Applicability extends to development and maintenance of security metrics; security evaluation criteria and evaluation methodologies; tests and test methods; security-specific criteria for laboratory accreditation; guidance on the use of evaluated and tested products; research to address assurance methods and system-wide security and assessment methodologies; security protocol validation activities; and appropriate coordination with assessment-related activities of voluntary industry standards bodies and other assessment regimes.

Annex C of FIPS 140-2 specifies Approved Random Number Generators.

BRIEF DESCRIPTION OF THE DRAWINGS

Embodiments of the invention relating to both structure and method of operation may best be understood by referring to the following description and accompanying drawings.

DETAILED DESCRIPTION

Embodiments of electronic circuits, systems, executable logic, and associated methods enable programmable reconfiguration of hardware to provide continuous random number generator checking.

United States Federal Government standard Federal Information Processing Standard (FIPS) Publication 140-2 (FIPS PUB 140-2) requires checking that each sample produced by a Random Number Generator (RNG) be checked against the immediately preceding sample to verify that the random number generator does not generate the same value twice sequentially, likely indicating a hardware or software fault rather than a coincidence. FIPS 140-2 specifies that any time a Random Number Generator (RNG) generates a new random number, the generated number is to be compared against a previously generated random number. If the two are the same, the event likely indicates a hardware (or software) failure rather than by chance. If the two are the same, an error indication is generated.

Particular random number generators may not automatically perform this checking. According to an embodiment, a modified configuration can reconfigure a security module to perform the check. For example, a particular system may wish to be compliant with requirements such as FIPS 140-2 but not perform the check in software such as to enable security in a "bump in the wire" architecture in a mostly-autonomous datapath. Thus, security can be implemented in separate devices interposed between devices intended to communicate securely, for example insecure Internet Protocol (IP) datagrams can be repackaged securely for transport over the public Internet.

In accordance with various embodiments, the illustrative technique can facilitate random number generator checking, which may be performed without using any microprocessor execution time or specialized hardware.

Thus, the disclosed technique performs random number generator checking outside of random number generator hardware, and may be performed without execution of microprocessor software cycles. The technique avoids additional coherency fabric bandwidth consumption and can, for example, avoid wasting of software cycles that would otherwise be used to check the random numbers. A security module or engine that produces random numbers and inserts the random number into packets can further be used to perform the random number checking.

Embodiments of the security module can include hardware that implements cryptographic processing for protocols such as Transport Layer Security (TLS), Datagram Transport Layer Security (DTLS), and Internet Protocol security (IPsec).

According to an embodiment, a descriptor can be configured to perform random number checking, for example as specified by FIPS 140-2. A descriptor can be defined as a cryptographic program that describes locations of input and output data, and operations to perform on the data. In some embodiments, circuitry or software elements can be configured to be controlled by a descriptor. In particular, the descriptor can include instructions that cause the security module to access the random number from an encapsulated frame, for example DTLS-encapsulated frame, which was previously generated by the security module. The descriptor can further instruct the security module to compare the accessed random number to a previous sample (for example, a previously generated random number), which was stored (for example, within the descriptor) during a previous execution of that descriptor. If the two random number samples are different, then the descriptor can write data to the descriptor, for example writing the last two samples back into the descriptor to facilitate convenience in auditing in some embodiments. If the two random number samples are identical, then the security module uses error signaling to alert the next hardware block in the path regarding the possible problem.

Figure 1:
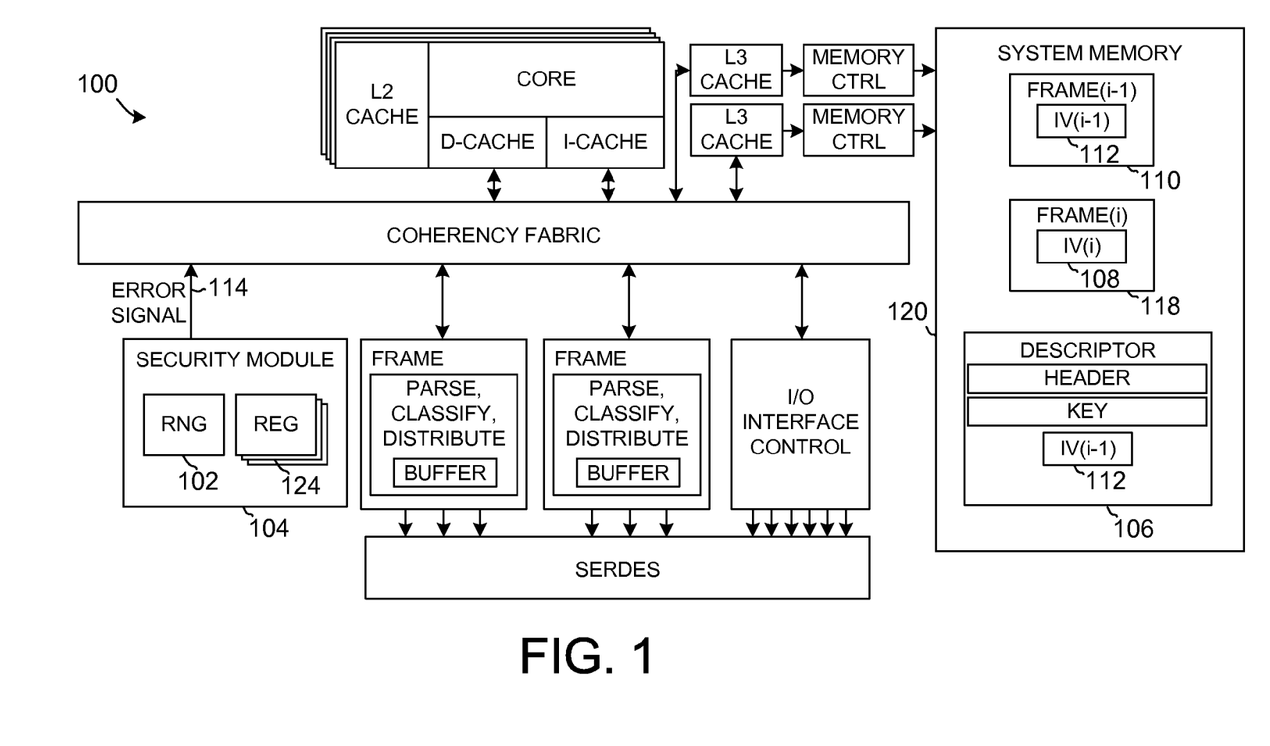
FIGS. 1 and 1.1 are schematic block diagrams illustrating an embodiment of an electronic circuit that uses reconfiguration of hardware to continuously check a random number generator.
Figure 11:
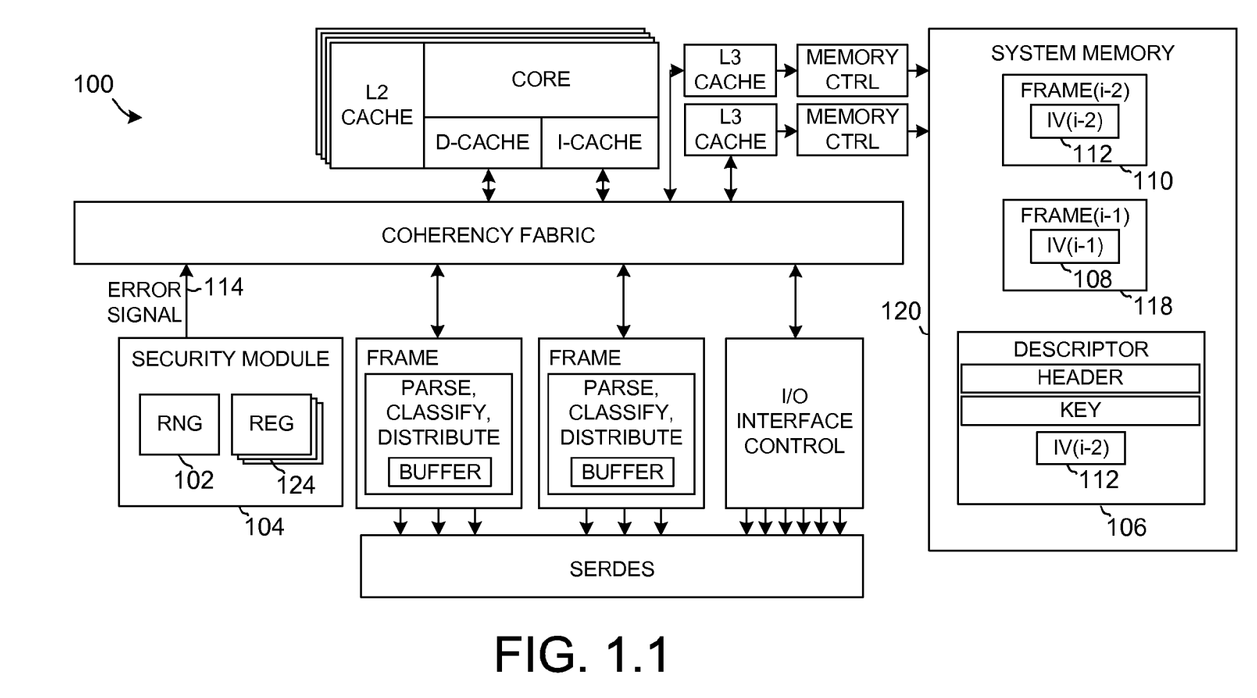

Referring to FIG. 1, including FIG. 1.1, a schematic block diagram illustrates an embodiment of an electronic circuit 100 that facilitates continuous checking of numbers supplied by a random number generator 102. The illustrative electronic circuit 100 comprises a module 104, such as a security module 104, configured to perform cryptographic processing for a predetermined security protocol comprising random number generation and checking. The security module 104 is controlled by a descriptor 106 that includes instructions which, when executed by the security module 104, causes the security module 104 to access a generated random number 108, and compare the generated random number 108 to a random number 112 stored in the descriptor 106 during a previous execution of the descriptor 106 (a "previous execution random number"). The security module 104 generates an error signal 114 when the generated random number 108 and the previous execution random number 112 are equal. In some embodiments, a cryptographic module such as the security module 104 can read the descriptor 106 from system memory 120, generate a new random number 108 (using random number generator 102), and compare the random number 108 with the random number 112 stored in the descriptor 106, which is the previously generated random number 112. The cryptographic module can then flag an error if the two random numbers 108 and 112 are the same.

FIG. 1 depicts the electronic circuit 100 after the random number checking is performed. FIG. 1.1 shows the electronic circuit 100 prior to random number checking and updating of the random numbers in the output frames.

A random number is generated by the random number generator 102 in the security module 104 and is not read from system memory 120. The descriptor 106, which contains at least one previous random number 112, can either be present inside the security module 104 if already used by a prior job, or can be in memory 120, in which case the previous random number 112 is read. When a job runs, the previous random number 112 is, therefore, either already present or read from memory 120 with the rest of the descriptor 106. The new random number is generated and used, and written to memory 120 as part of the output and compared to the prior number(s).

The descriptor 106 is typically a software construct or code that supplies instructions to control operations and functions performed by the security module 104. The security module 104 can be a security accelerator with various added capabilities. The security module 104 generates random numbers, for example as part of the Datagram Transport Layer Security (DTLS) or other suitable protocol. The security module 104 includes the random numbers which can be part of a DTLS packet that is written and sent over a network. The electronic circuit 100 is configured to enable FIPS testing of the quality of the random numbers. FIPS governs the capabilities and requirements of computer hardware that is used by the United States government. Any supplier of equipment to the government is demanded to perform the specified random number checking. A particular specification of FIPS 140-2 requires that the random number not be duplicated twice in a row.

DTLS is a protocol set forth to ensure communications privacy for datagram protocols. DTLS allows datagram-based applications to communicate in a manner designed to prevent eavesdropping, tampering, or message forgery. The DTLS protocol derives from a stream-oriented Transport Layer Security (TLS) protocol and is intended to supply similar security. Datagram semantics of the underlying transport are preserved by the DTLS protocol so that an application is not degraded by delays associated with stream protocols but is subject to reduced performance as a result of packet reordering, loss of datagram, data larger than a datagram packet size, and the like.

In some embodiments of the electronic circuit 100, the security module 104 can be controlled by the descriptor 106 that instructs the security module 104 to continue processing as directed by the descriptor 106, output any information resulting from the processing to an output frame 110 in the system memory 120, and output the generated random number into the descriptor 106 for use in the next cycle as random number 112. The actions of continuing processing and outputting of the results and the generated random number 108 are performed either when the generated random number 108 and the previous execution random number 112 are different or when the comparison of the random numbers 108 and 112 takes place subsequent to one or more of the actions, thereby terminating any actions not yet complete. Thus, when packet processing has completed, the newly generated random number is stored in the descriptor 106, in a location reserved for such storage. Accordingly, the cryptographic module (security module 104) can continue processing, process a packet, output results of the processing to an output frame 110, and output the random number 108 into the descriptor 106. These operations can be performed if the generated random number 108 and the previous execution random number 112 are different or, depending on when an error condition is detected, one or more of the operations can take place if the if the generated random number 108 and the previous execution random number 112 are the same.

Thus, a suitable embodiment of the electronic circuit 100, security module 104, and descriptor 106 can process a packet and output the results to an output frame 110 before checking the newly generated random number 108 with the previously generated random number 112, or first perform the checking. If the two random numbers are different—the case of normal operation, the packet is processed correctly in either case. If checking of the random numbers is performed prior to completion of processing of the packet and outputting of the results and random number 108, no processing of the packet takes place. Otherwise, if checking of the random numbers is performed subsequent to processing of the packet and outputting of the results and random number 108 are complete, the processing of the packet and writing of results and the random number to the output frame 110 are inconsequential as long as the error is generated indicating that results written to the output frame 110 are not to be used.

Similarly, in some embodiments and/or applications of the electronic circuit 100, the security module 104 can be controlled by the descriptor 106 that instructs the security module 104 to continue processing as directed by the descriptor 106, output results of the processing to an output frame 110, and output the generated random number 108 to a location (such as in a static buffer) in memory 120 pointed to by the descriptor 106 for storage and retrieval. In these embodiments and/or applications, the descriptor 106 can point to location in memory 120 where the random number 108 is stored and retrieved. The descriptor 106 can thus convey to the cryptographic hardware a location to find the previously generated random number and a location to store the newly generated random number.

In particular embodiments and/or applications of the electronic circuit 100, the security module 104 can be controlled by the descriptor 106 that instructs the security module 104 to access the generated random number 108 by reading from the output frame 118, and compare the generated random number 108 to a random number 112 stored in the descriptor 106 during a previous execution of the descriptor 106. For example, since the newly generated random number 108 is to be stored in the output frame 118, as part of the packet-processing operation the previously generated random number may have been deleted internally before checking is performed. Thus the newly generated random number 108 may be read from the output frame 118, and compared with the value 112 in the descriptor 106.

In further more specific embodiments of the electronic circuit 100, the security module 104 can be configured to process a stream of Datagram Transport Layer Security packets that arrive in a stream of input frames and associated output frames, generate a random number for use as an initialization vector (IV) 108 wherein IV 108 is a random number exclusive-ORed (XORed) with a mask, compare the IV 108 to a previously generated IV 112 previously written to an output frame 118 in a system memory 120, store the generated IV 108 and a stored IV copy 112 in at least one register 124, compare the generated IV 108 and the stored IV copy 112 by exclusive-OR (XOR), and flag an error 114 for a zero result of the comparison, for example indicating that the generated IV 108 and the stored IV copy 112 are equal.

In an illustrative use case, the stream of DTLS packets arrive in a stream of input frames, for example buffers in memory 120 in which input packets are located, and associated output frames (for example, output frames 110, 118), such as buffers in memory 120 in which output packets are located. The output frames 110, 118 may be specified to have a larger size than an actual packet to enable inclusion of information other than the packet. Processing the DTLS packet can include the generation of a random number for usage as an Initialization Vector (IV). The IV can be stored with the output packet in the output frame.

The Initialization Vector (IV) 108, 112, as defined in the field of cryptography, is a fixed-size input to a cryptographic primitive that is typically specified to be random or pseudorandom. Randomization is used in encryption schemes in which repeated usage of a scheme under the same key does not allow an attacker to infer relationships between segments of the encrypted message. For block ciphers, use of an IV is described by predetermined modes of operation. Randomization is also used for other primitives including universal hash functions and message authentication codes.

Initialization vectors can be used by various cryptographic functions, for example Advanced Encryption Standard (AES).

In some embodiments of the electronic circuit 100, the security module 104 can be controlled by the descriptor 106 that includes instructions which, when executed by the security module 104, cause the security module 104 to store the generated random number 108 and the previous execution random number 112 in an output frame 110, 118 in system memory 120.

In a particular implementation of the electronic circuit 100, processing of the packet and checking of the random numbers can be done completely by hardware with no ability for software to verify that the random number checking is performed correctly. To enable software to audit the hardware checking, the descriptor 106 can be usefully configured to include extra storage space for storing random numbers, for example two random numbers. One storage space is commonly the random number or IV which is used by the associated packet so storage for only one extra random number need be allocated. If after checking the newly generated random number against the previously generated random number, the two random numbers are determined to be different, the previously generated random number, which can be the IV for the previous packet, can be stored in the extra space in the output frame. By inspecting a descriptor 106, software can verify that the two random numbers are actually different.

Thus in various embodiments of the electronic circuit 100, the security module 104 can be configured to store one or more random numbers (such as in registers 124) for at least one previous execution of the descriptor 106. In a particular example embodiment, the security module 104 can be configured to store random numbers for two previous executions of the descriptor 106 if the accessed random number 108 and the previous execution random number 112 are different. In other example embodiments, the security module 104 can be configured to store random numbers for two previous executions of the descriptor 106 whether the accessed random number 108 and the previous execution random number 112 are different or the same, for example for analysis of the random numbers if equal. Another embodiment can store in the descriptor 106 just the latest random number, preventing audit but allowing for a smaller descriptor.

When the hardware random number checking indicates that the two random numbers are the same, and an error is generated 114, the output frame may not contain any useful data. Therefore, hardware outputting of both random numbers is unnecessary. Some embodiments of the electronic circuit 100 can always write both random numbers to the descriptor 106. Writing both can be useful for analysis and possible usage if the random numbers are different.

In particular embodiments of the electronic circuit 100, the security module 104 can be configured to compare the accessed random number 108 to a random number 112 stored (such as in descriptor 106, registers 124, or elsewhere) during an immediately preceding execution of the descriptor 106. In other embodiments, the security module 104 can be configured to store random numbers for two immediately preceding executions of the descriptor 106. In particular embodiments, the security module 104 can be configured to store random numbers for two immediately preceding executions of the descriptor 106 when the accessed random number 108 and the previous execution random number 112 are different.

In some embodiments and/or applications of the electronic circuit 100, the security module 104 can be controlled by a descriptor 106 that conveys information which is generic to a flow made up of a sequence of packets on a communication link.

In embodiments of the electronic circuit 100, the security module 104 can be configured for control by a descriptor 106 that comprises a cryptographic program that describes locations of input and output data, and operations to perform on the data.

In embodiments of the electronic circuit 100, the security module 104 can be configured for control by a descriptor 106 that is modified during execution and accessed as a static data block that is used for processing every packet in a stream.

The descriptor 106 is modified during execution of the descriptor 106, in an embodiment, and used for processing every packet. Otherwise, the random number would not be properly located within the descriptor 106.

In various embodiments of the electronic circuit 100, the security module 104 can be configured to perform cryptographic processing for one or more predetermined security protocols selected from a Transport Layer Security (TLS), Datagram Transport Layer Security (DTLS), Internet Protocol security (IPsec), and the like.

TLS is a cryptographic protocol that provides communication security over the Internet. TLS encrypts the segments of network connections above the Transport Layer and use asymmetric cryptography for key exchange, symmetric encryption for privacy, and message authentication codes for message integrity which can include random number generation and checking. TLS is an Internet Engineering Task Force (IETF) standards track protocol, last updated in Request for Comments (RFC) 5246, and is based on the earlier Secure Sockets Layer (SSL) specifications developed by Netscape Communications. Versions of the protocols can be used in applications including web browsing, electronic mail (email), Internet faxing, instant messaging, voice-over-IP (VoIP), and the like.

TLS performs security techniques including: 1) protecting against protocol downgrade to a less secure version or weaker cipher suite, 2) numbering application records with a sequence number which is used in message authentication codes (MACs), 3) using a message digest enhanced with a key so that only a key-holder can check the MAC, 4) handling a message that ends with a "finished" handshake which sends a hash of all exchanged handshake messages seen by both parties, 5) supplying a pseudorandom function that splits input data and processes the split data with different hashing algorithms which are XORed to create a MAC, 6) adding SHA-1 based ciphers and support for certification authentication, and the like.

In particular embodiments of the electronic circuit 100, the security module 104 can be configured to perform random number generation checking specified by Federal Information Processing Standards (FIPS) 140-2.

Some embodiments of the electronic circuit 100 can further comprise the random number generator 102. A random number generator is a computational or physical device that generates a sequence of numbers or symbols that are apparently random and thus lack any pattern. Examples of applications for usage of random number generators include cryptography, statistical sampling, debugging in which execution is tested by a same sequence of random numbers, computer simulation such as Monte Carlo simulation, randomized design, gambling or gaming, and other areas in which production of an unpredictable result is useful.

Generation of pseudo-random numbers is useful in computer programming. Applications such as cryptography and particular numerical algorithms are best performed using a very high degree of apparent randomness. Other operations are suitable with only a modest amount of unpredictability. Weaker forms of randomness can be used in hash algorithms and for amortized searching and sorting algorithms.

A random number generator, while purportedly a source of random numbers, may fail to produce numbers which are sufficiently unbiased. For example, a quantum mechanically based hardware RNG can have behavior that changes with temperature, power supply voltage, device age, or other external interference. Furthermore, errors can result from a software bug in a pseudo-random number generator, a hardware bug in the device executing the software routine, or a combination of bugs. Such errors are typically difficult to detect.

Generated random numbers can be tested, for example using statistical tests, to ensure correct operation. In some applications, the random numbers can also be post-processed to improve statistical properties.

The illustrative electronic circuit 100 and associated technique enable hardware to check the random number in an automated flow, specifically a flow with no software data handling.

A custom descriptor can configure a security engine so that after security processing, for example DTLS processing, completes, the security engine accesses a random number from the output frame in system memory, and compares that random number against a random number stored within the descriptor. When the two random numbers are identical, an error is signaled.

A security engine can be configured in a manner that can be optionally applicable to various security accelerators. In an example implementation, the security engine can perform and complete DTLS, and then access an Initialization Vector (IV) written to an output frame in system memory. The accessed IV and a stored IV copy can be subsequently stored in internal processing registers in the security engine. The security engine can compare the two IVs by eXclusive-ORing (XOR) operation, and flag an error if a zero results (for example, when the IVs are equal).

Figure 2:
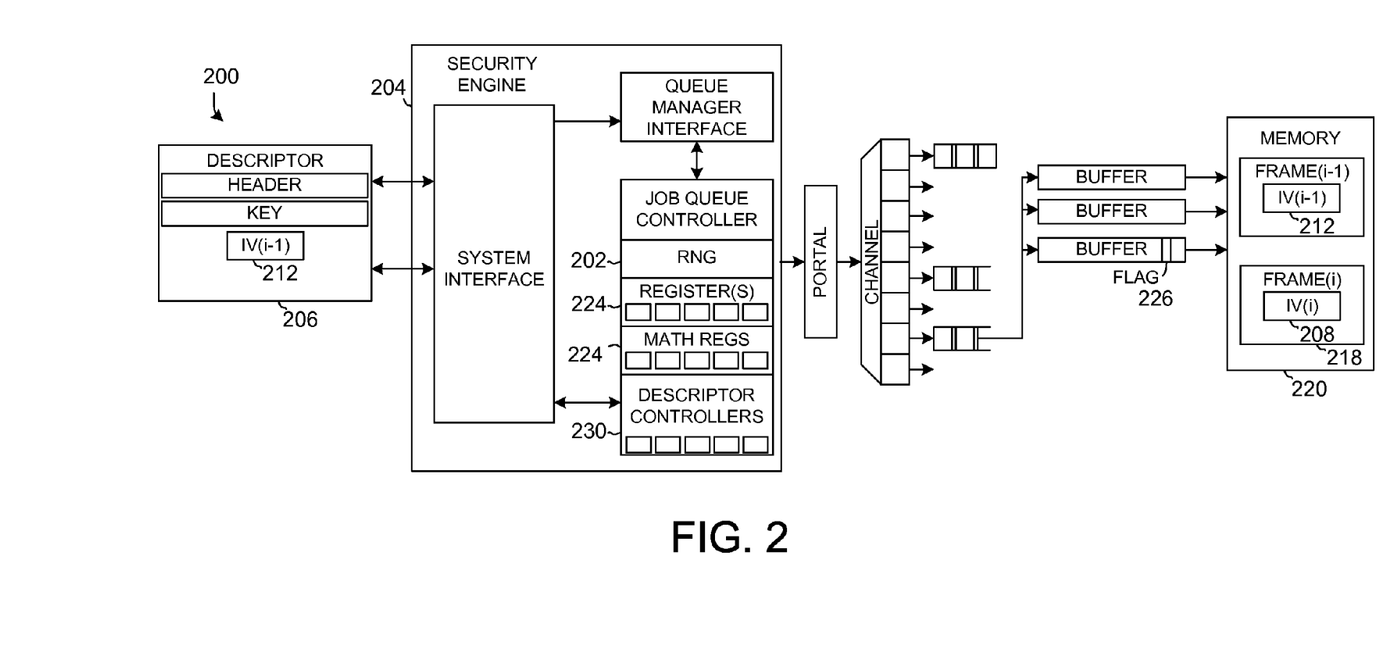
FIG. 2 is a schematic block diagram that depicts an embodiment of an executable logic for usage in programmably reconfiguring hardware to continuously check a random number generator.

Referring to FIG. 2, a schematic block diagram depicts an embodiment of an executable logic 200 for usage in reconfiguring hardware to continuously check a random number generator 202. The executable logic 200 can comprise a descriptor 206 configured to control a security engine 204 that performs cryptographic processing for a predetermined security protocol. The descriptor 206 can be operable to configure the security engine 204 so that after the cryptographic processing completes the security engine 204 accesses a generated random number 208, compares the generated random number 208 to a random number 212 stored in the descriptor 206 (or elsewhere) during a previous execution of the descriptor 206, and generates an error signal 226 if the generated random number 208 and the previous execution random number 212 are equal.

FIG. 2 depicts the executable logic 200 after the random number checking is performed.

The executable logic 200 can be in the form of software, firmware, hardware, or other logic, or possibly in the form of a data structure for usage in producing or defining the descriptor 206, or a combination of any of the above.

In some embodiments of the executable logic 200, the descriptor 206 can be configured to instruct the security engine 204 to continue processing as directed by the descriptor 206, output any information which results from the processing to an output frame 218, and output the generated random number 208 into the descriptor 206 or to a location (for example in a static buffer) in memory 220 pointed to by the descriptor 206 for storage and retrieval.

In other embodiments, the executable logic 200 can comprise a descriptor 206 configured to control a security engine 204 that performs cryptographic processing for a predetermined security protocol. The descriptor 206 can be operable to configure the security engine 204 so that after the cryptographic processing completes the security engine 204 accesses a random number 208 from an output frame 218 in memory 220, and compares the random number 208 against a stored random number 212 which is stored in the descriptor 206. The security engine 204 can signal an error (such as by setting a flag 226) when the random number 208 and the stored random number 212 are identical.

The descriptor 206 includes space allocated for storing at least one prior copy of the random number. Storing a copy of the random number in a current packet enables the security engine 204 to compare the random number for the current packet in the frame number (i) to the random number for the prior packet in frame (i−1). This comparison can otherwise be made, for example in software executing on a core processor, but at the expense of burden on the processor. The illustrative technique enables random number checking without added burden to the core processor.

In further more specific embodiments of the executable logic 200, the descriptor 206 can be configured to instruct the security engine 204 to process a stream of DTLS packets that arrive in a stream of input frames and associated output frames 218, generate a random number for use as an initialization vector (IV) 208 wherein IV 208 is a random number exclusive-ORed (XORed) with a mask, compare the IV 208 to a previously generated IV 212 which was previously written to an output frame 218 in a system memory 220, and store the generated IV 208 and a stored IV copy 212 in at least one register 224. The descriptor 206 can be further configured to control the security engine 204 to compare the generated IV 208 and the stored IV copy 212 by exclusive-OR (XOR), and flag an error 226 for a zero result of the comparison.

Accordingly, the security engine 204 is controlled, in this instance, by the descriptor 206 which configures the security engine 204 to perform DTLS encapsulation. The security engine 204 performs encapsulation by taking a preponderance of the input frame corresponding to the packet and encrypting the information using an algorithm such as Advanced Encryption Standard—Cipher Block Chaining (AES-CBC) which specifies that every packet that is encrypted, no matter the length, must be accompanied by an initialization vector (IV). DTLS specifies that IV is either random or derived from a random value. More precisely, the IV is not mathematically identical to the random number in the illustrative embodiment. In an implementation, the random number can be XORed with a mask. In the shown embodiment of the security module, the IV is stored in the descriptor. The mask can be a constant, or can be the last cipherblock from frame i−1. Whether the mask is a constant or not can be configured in an options bit within the descriptor.

For DTLS and TLS, the security module XORs the mask with the random number to produce the IV. If the mask is 0 and constant, then the IV will be the random number. If the mask is a non-zero constant, then the technique will still identify repeated random numbers, but random numbers are not compared. If a non-constant value is chosen, then a random number test is not performed.

An example implementation of DTLS gives options for deriving an IV from the random number, but the basic random number is generated by the random number generator (RNG) 202 that can be implemented in hardware in security engine 204. When requested, the security module 204 performs DTLS processing and automatically commands the random number generator 202 to generate a sixteen-byte random number, the specified length of the IV. The security engine 204 uses the random number for AES processing. The security engine 204 is required by security standardization, for example, to send the IV to a hash computation engine to perform a SHA-1 hash computation and include the IV as part of what is hashed.

In some embodiments of the executable logic 200, the descriptor 206 can comprise a cryptographic program that describes locations of input and output data, and operations to perform on the data.

Also, in some embodiments of the executable logic 200, the descriptor 206 can be modified during execution although accessed as a static data block that is used for processing every packet in a stream of packets.

In some embodiments and/or applications of the executable logic 200, the descriptor 206 can be configured to control the security engine 204 to store random numbers for two previous executions of the descriptor 206. In a particular example implementation, the descriptor 206 can be configured to control the security engine 204 to store random numbers for two previous executions of the descriptor 206 when the accessed random number 208 and the previous execution random number 212 are different.

In further embodiments of the executable logic 200, the descriptor 206 can be configured to store random numbers for multiple (for example, two) previous executions of the descriptor 206. In various embodiments, the descriptor 206 can be configured to store random numbers for multiple previous executions of the descriptor 206 when the accessed random number 208 and the previous execution random number 212 are different, or store the random numbers regardless of equality or inequality of the random numbers.

In particular applications of the executable logic 200, the descriptor 206 can be configured to control the security engine 204 to compare the accessed random number 208 to a random number 212 stored during an immediately preceding execution of the descriptor 206, and store random numbers for two immediately preceding executions of the descriptor 206.

In various embodiments of the executable logic 200, the descriptor 206 can be configured to control the security engine 204 to perform cryptographic processing for at least one predetermined security protocol selected from, for example, Transport Layer Security (TLS), Datagram Transport Layer Security (DTLS), Internet Protocol security (IPsec), and the like.

In particular embodiments of the executable logic 200, the descriptor 206 can be configured to control the security engine 204 to perform random number generation checking specified by Federal Information Processing Standards (FIPS) 140-2.

Some embodiments of the security engine 204 can implement DTLS to perform cryptographic computations in the background to facilitate DTLS processing. The security engine 204 can include one or more descriptor controllers (DECOs) 230. The descriptor controller (DECO) 230 parses the descriptor 206 and configures hardware to perform various cryptographic operations. The security engine 204 can further include one or more registers 224 or other internal comparison registers in the DECO 230 for use in various arithmetic and logical functions. The security engine 204 can be configured to perform operations specific for one or more security protocols such as, for example, TLS, DTLS, IPsec, and others. For example, the security engine 204 can operate using an IV that is random in accordance with DTLS. In an illustrative capability of the DECO 230, the security engine 204 can enable an IV that, rather than being random, is a monotonically increasing number, as is allowed for IPsec, for example by loading a last-used IV into a register 224, adding one, using the result as the next IV, and storing the incremented next IV back into the register 224 for use with the next packet The DECO 230 also can use pieces of the descriptor as constants or variables. One such variable is a sequence number. As a part of DTLS processing, a sequence number that is part of the packet can be generated as part of the encapsulation process. A value that is stored in a particular field in the descriptor can be incremented, then written back. When the descriptor has completed processing, the field in the descriptor can be written back to main memory for storage in the system.

The security engine 204 thus includes a random number generator 202, one or more DECOs 230, and registers 224 in the DECO 230. Random numbers are generated automatically within registers 224 of the DECO 230. Once AES finishes processing, DTLS also finishes processing and the generated random number is not held within the security engine 204, but is rather transferred outside of the security engine 204 into memory where the output frame 218 generated by the security engine 204 was written. Thus, the random number is no longer available within the security engine 204.

In an illustrative embodiment, the security engine 204 can be configured to function such that, following completion of DTLS processing, the descriptor 206 can cause the security engine 204 to access the random number or initialization vector (IV), for example from the output frame 218 that is written to memory, and load it into a MATH register 224. In other embodiments, the IV can be accessed elsewhere. In an example DTLS embodiment, the security engine 204 reads the IV from the written output frame because the IV is not available anywhere within the security engine 204. The security engine 204 can also be controlled to further access the previously-stored random number from the (i−1) packet from storage in the descriptor 206, and to place the previously-stored random number into a MATH register 224. Storage of the random numbers into MATH registers 224 enable comparisons of the random numbers so that if all bits in the random numbers are identical, the security engine 204 can signal an error (for example, flag 226).

The descriptor 206 can further control the security engine 204 to read back the random number for the current packet from memory and store the read-back random number (i) into the descriptor 206 in combination with the random number (i−1) that is accessed from the descriptor 206 for the current packet to facilitate comparison for the random number (i+1) in the next packet in future processing. In an example embodiment, the descriptor 206 can control the security engine 204 to store both random numbers (i) and (i−1) back into the descriptor 206 if the additional storage space, for example sixteen bytes, is available to more efficiently perform random number checking and to enable further random number auditing, if desired.

Figure 3:
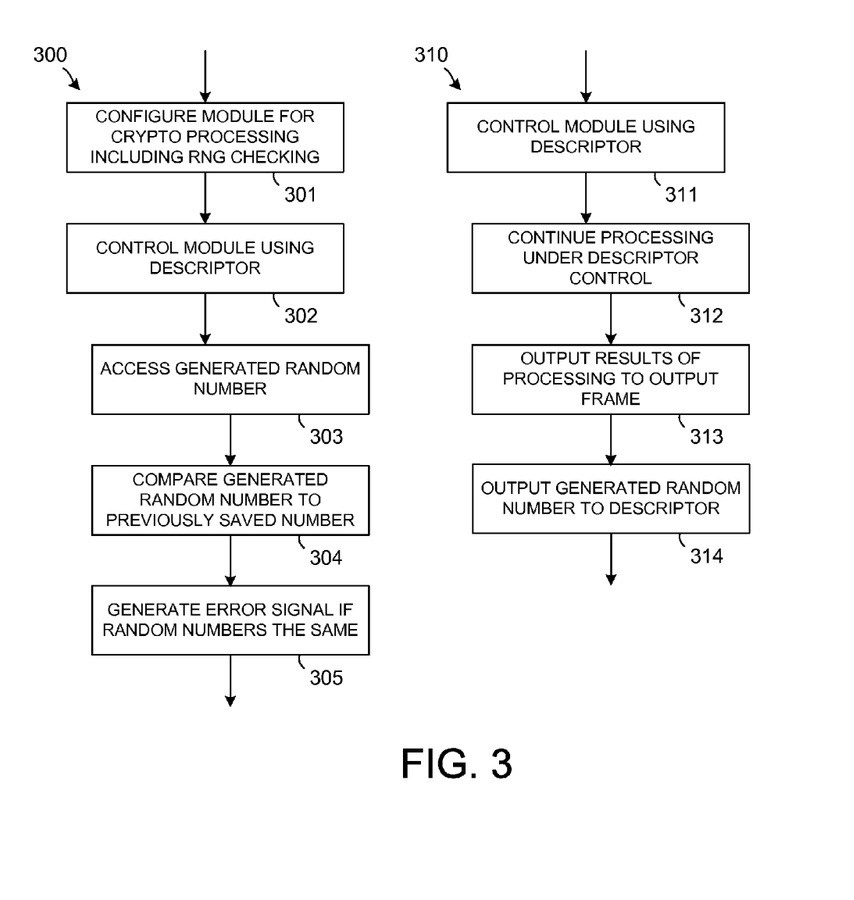
FIG. 3, including FIGS. 3.1 and 3.2, are schematic flow charts showing an embodiment or embodiments of a method for cryptographically securing an information system that facilitates programmable reconfiguration of hardware to continuously check a random number generator.
Figure 31:
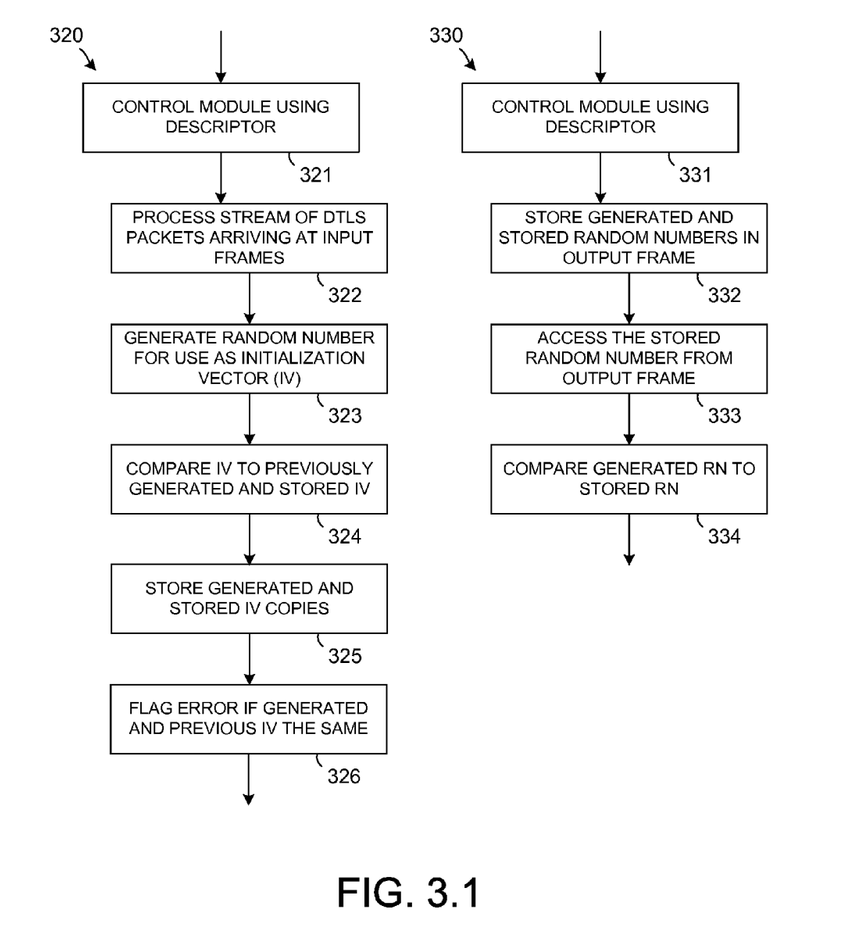
Figure 32:
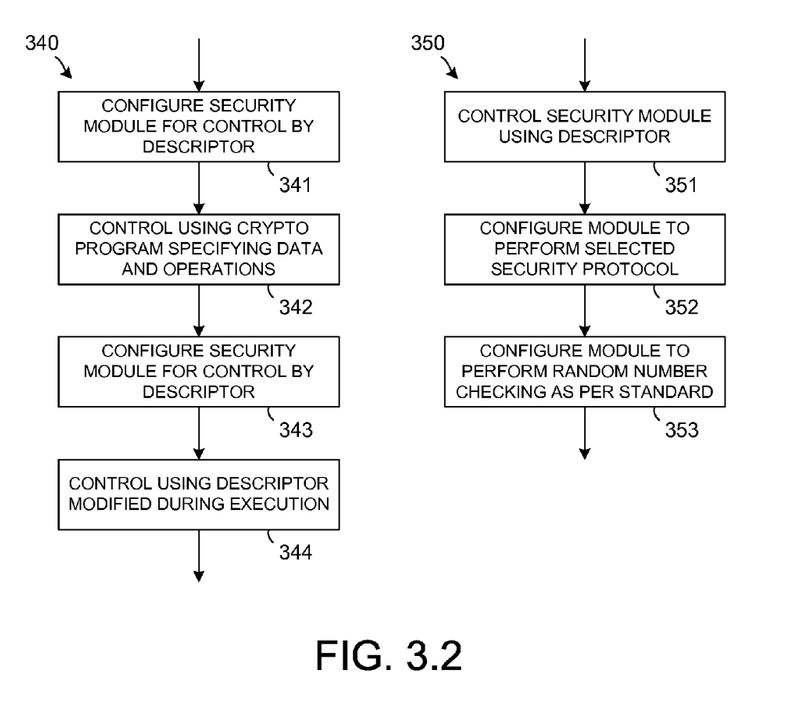

Referring to FIG. 3, including FIGS. 3.1 and 3.2, schematic flow charts showing an embodiment or embodiments of a method for cryptographically securing an information system that facilitates programmable reconfiguration of hardware to continuously check a random number generator. The illustrative method 300 for cryptographically securing an information system can comprise configuring 301 a module, such as a security module, to perform cryptographic processing for a predetermined security protocol comprising random number checking, and controlling 302 the security module using a descriptor that instructs the security module to access 303 a generated random number, compare 304 the generated random number to a previously saved number (such as a random number stored in the descriptor) during a previous execution of the descriptor, and generate 305 an error signal if the generated random number and the previous execution random number are equal.

Some embodiments of a method 310 for cryptographically securing an information system can further comprise controlling 311 the module using a descriptor that instructs the module to continue processing 312 as directed by the descriptor, output results 313 of the processing to an output frame, and output 314 the generated random number into the descriptor or to a location (for example in a static buffer) in memory pointed to by the descriptor for storage and retrieval. In various embodiments, the module can fetch the descriptor from system memory for usage in instructing the module.

In some embodiments, the method 320 for cryptographically securing an information system can include storing of random numbers. For example, the method 320 for cryptographically securing an information system can further comprise controlling 321 the module using a descriptor that instructs the module to process 322 a stream of DTLS packets that arrive in a stream of input frames and associated output frames, generate 323 a random number for use as an initialization vector (IV) wherein IV is a random number exclusive-ORed (XORed) with a constant mask, and compare 324 the IV to a previously generated IV previously written to an output frame in a system memory. The comparison 324 can be performed, for example, by exclusive-OR (XOR). The method 320 for cryptographically securing an information system can further comprise controlling 321 the module using a descriptor that further instructs the module to store 325 the generated IV and a stored IV copy in at least one register, and flag 326 an error for a zero result of the comparison, which indicates that the generated IV and stored IV are the same.

Additional embodiments of a method 330 for cryptographically securing an information system can comprise controlling 331 the module using a descriptor that instructs the module to store 332 the generated random number and the previous execution random number in an output frame. The method 330 for cryptographically securing an information system can further comprise controlling 331 the module using a descriptor that instructs the module to access 333 the generated random number by reading from an output frame, and compare 334 the generated random number to a random number stored in the descriptor during a previous execution of the descriptor.

In particular embodiments of a method 340 for cryptographically securing an information system can comprise configuring 341 the module for control 342 by a descriptor comprising a cryptographic program that describes locations of input and output data, and operations to perform on the data. The method 340 can further comprise configuring 343 the module for control 344 by a descriptor that is modified during execution and accessed as a static data block that is used for processing every packet in a stream.

In several embodiments of a method 350 for cryptographically securing an information system, the security module can be controlled 351 using a descriptor that conveys information generic to a flow, and the security module can be configured 352 to perform cryptographic processing for at least one predetermined security protocol selected from TLS, DTLS, IPsec, or the like. The security module can further be configured 353 to perform random number generation checking specified by Federal Information Processing Standards (FIPS) 140-2.

While the principles of the disclosed system are described above in connection with specific apparatus, it is to be clearly understood that this description is made only by way of example and not as a limitation on scope of the appended claims.

The illustrative pictorial diagrams depict structures and process actions in a secure communication process. Although the particular examples illustrate specific structures and process acts, many alternative implementations are possible and commonly made by simple design choice. Actions may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, shapes, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. An electronic circuit comprising:
a module configured in hardware and/or firmware that performs cryptographic processing for a predetermined security protocol comprising random number checking, wherein the module accesses a descriptor from system memory, and the module executes the descriptor; and
the descriptor for storing a previously-accessed random number, wherein the descriptor includes instructions and descriptor memory for storing the previously-accessed random number, wherein the previously-accessed random number is a random number that the module accessed during a previous execution of the descriptor, and wherein the descriptor instructions include instructions that cause the module to newly access a random number, referred to as a newly-accessed random number, to compare the newly-accessed random number to the previously-accessed random number stored in the descriptor storage, to generate an error signal when the newly-accessed random number and the previously-accessed random number are equal, and to store the newly-accessed random number into the descriptor in system memory, and
wherein the module is configured by the descriptor to:
process a stream of Datagram Transport Layer Security packets that arrive in a stream of input frames and associated output frames,
generate a number for use as an initialization vector (IV), wherein the IV is a random number exclusive-ORed (XORed) with a mask that is selected from a constant and a last cipherblock from a previous frame, and wherein an options bit is used to configure whether or not the mask is the constant,
compare the IV to a previously generated IV previously written to an output frame in a system memory,
store the generated IV and a stored IV copy in at least one register,
compare the generated IV and the stored IV copy by exclusive-OR (XOR), and
flag an error for a zero result of the comparison.

2. The electronic circuit according to claim 1 wherein:
the module is controlled by the descriptor that includes instructions that cause the module to continue processing as directed by the descriptor, and output results of the processing to the output frame.

3. The electronic circuit according to claim 1 wherein:
the module is controlled by the descriptor that includes instructions that cause the module to store the newly-accessed random number and the previously-accessed random number in the output frame.

4. The electronic circuit according to claim 1 wherein:
the module is controlled by the descriptor that includes instructions that cause the module to access the newly-accessed random number by reading from the output frame in the system memory.

5. The electronic circuit according to claim 1 wherein:
the module executes a descriptor comprising a cryptographic program that describes locations of input and output data, and operations to perform on the data.

6. The electronic circuit according to claim 1 wherein:
the module accesses the descriptor as a static data block that is used for processing every packet in the stream.

7. The electronic circuit according to claim 1 wherein:
the module is configured by the descriptor to perform cryptographic processing for at least one predetermined security protocol selected from a group consisting of Transport Layer Security (TLS) and Internet Protocol security (IPsec); and
the module is configured by the descriptor to perform random number generation checking specified by Federal Information Processing Standards (FIPS) 140-2.

8. The electronic circuit according to claim 1 further comprising:
a random number generator.

9. An executable logic device comprising:
a security circuit configured in hardware and/or firmware; and
a descriptor that includes descriptor storage and instructions that are executable on the security engine that performs cryptographic processing for a predetermined security protocol, wherein a previously-accessed random number that the security engine accessed during a previous execution of the descriptor is stored in the descriptor storage, and the descriptor, when subsequently executed on the security engine, configures the security engine so that after the cryptographic processing completes, the security engine newly accesses a random number, referred to as a newly-accessed random number, compares the newly-accessed random number to the previously-accessed random number stored in the descriptor storage, generates an error signal when the newly-accessed random number and the the previously-accessed random number are equal, and stores the newly-accessed random number into the descriptor in system memory, and
wherein the module is configured by the descriptor to:
process a stream of Datagram Transport Layer Security packets that arrive in a stream of input frames and associated output frames,
generate a number for use as an initialization vector (IV), wherein the IV is a random number exclusive-ORed (XORed) with a mask that is selected from a constant and a last cipherblock from a previous frame, and wherein an options bit is used to configure whether or not the mask is the constant,
compare the IV to a previously generated IV previously written to an output frame in a system memory,
store the generated IV and a stored IV copy in at least one register, compare the generated IV and the stored IV copy by exclusive-OR (XOR), and
flag an error for a zero result of the comparison.

10. The executable logic according to claim 9 wherein:
the descriptor comprises a cryptographic program that describes locations of input and output data, and operations to perform on the data; and
the descriptor is modified during execution and accessed as a static data block that is used for processing every packet in the stream of packets.

11. A method for cryptographically securing an information system comprising:
executing a module to perform cryptographic processing for a predetermined security protocol comprising random number checking, including accessing, from system memory, a descriptor as a static data block that is used for processing every packet in a stream of packets;
controlling the module using the descriptor, which includes instructions and descriptor storage in which a previously-accessed random number is stored, wherein the previously-accessed random number is a random number that the module accessed during a previous execution of the descriptor, and wherein the descriptor instructions include instructions that cause the module to newly access a random number, referred to as a newly-accessed random number, to compare the newly-accessed random number to the previously-accessed random number stored in the descriptor storage, to generate an error signal when the newly-accessed random number and the previously-accessed random number are equal, to modify the descriptor during execution by storing the newly-accessed random number into the descriptor storage of the descriptor in system memory, and wherein the module is configured by the descriptor to further perform the instructions comprising:

processing a stream of Datagram Transport Layer Security packets that arrive in a stream of input frames and associated output frames,     generating a number for use as an initialization vector (IV), wherein the IV is a random number exclusive-ORed (XORed) with a mask that is selected from a constant and a last cipherblock from a previous frame, and wherein an options bit is used to configure whether or not the mask is the constant,     comparing the IV to a previously generated IV previously written to an output frame in a system memory,     storing the generated IV and a stored IV copy in at least one register,     comparing the generated IV and the stored IV copy by exclusive-OR (XOR), and     flagging an error for a zero result of the comparison.

12. The method according to claim 11 further comprising:
controlling the module using the descriptor that includes instructions that cause the module to continue processing as directed by the descriptor, and output results of the processing to the output frame.

13. The method according to claim 11 further comprising:
controlling the module using the descriptor that includes instructions that cause the module to store the newly accessed random number and the previously-accessed random number in the output frame; and controlling the module using the descriptor that includes instructions that cause the module to access the newly-accessed random number by reading from the output frame.

14. The method according to claim 11 further comprising:
configuring the module for control by the descriptor comprising a cryptographic program that describes locations of input and output data, and operations to perform on the data.

15. The method according to claim 11 further comprising:
configuring the module to perform cryptographic processing for at least one predetermined security protocol selected from a group consisting of Transport Layer Security (TLS) and Internet Protocol security (IPsec); and configuring the module to perform random number generation checking specified by Federal Information Processing Standards (FIPS) 140-2.

\* \* \* \* \*